No. 674,926. Patented May 28, 1901.
J. MACPHAIL.
TOOL FOR SETTING AND REMOVING SPRING TEETH.
(Application filed Nov. 26, 1900.)
(No Model.) 2 Sheets—Sheet 1.

Witnesses: Inventor:
Wm. A. Dreffein. James Macphail
Chas. H. Chambers. by J. F. Steward,
his Attorney.

No. 674,926. Patented May 28, 1901.
J. MACPHAIL.
TOOL FOR SETTING AND REMOVING SPRING TEETH.
(Application filed Nov. 26, 1900.)
(No Model.) 2 Sheets—Sheet 2.

Witnesses:
Wm. A. Dreffein
Chas. M. Chambers

Inventor:
James Macphail
by J.F. Steward
his Attorney.

UNITED STATES PATENT OFFICE.

JAMES MACPHAIL, OF BLUE ISLAND, ILLINOIS.

TOOL FOR SETTING AND REMOVING SPRING-TEETH.

SPECIFICATION forming part of Letters Patent No. 674,926, dated May 28, 1901.

Application filed November 26, 1900. Serial No. 37,807. (No model.)

*To all whom it may concern:*

Be it known that I, JAMES MACPHAIL, a citizen of the United States, residing at Blue Island, in the county of Cook and State of Illinois, have invented certain new and useful Improvements in Tools for Setting and Removing Spring-Teeth; and I do hereby declare the following to be a full, clear, and exact description of the invention, such as will enable others skilled in the art to which it appertains to make and use the same, reference being had to the accompanying drawings, forming a part of this specification.

My invention relates to a special implement to be employed in setting in and removing spring-teeth from a head or tooth-holder, and has for its object to provide a hand implement wherewith the spring end of a tooth may be grasped and compressed to permit the spring to be secured in the head, or the head and spring may be simultaneously engaged to unlock the parts and the spring subsequently grasped and compressed to permit the removal of the tooth.

Figure 1:
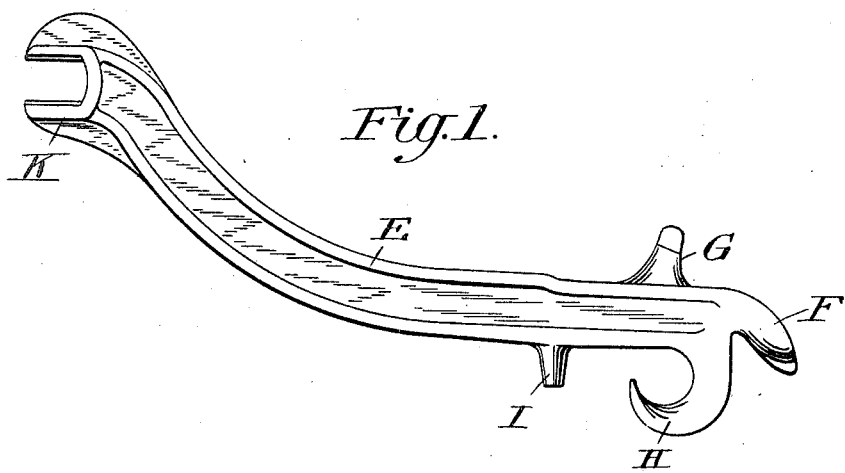
Figure 2:
Figure 3:
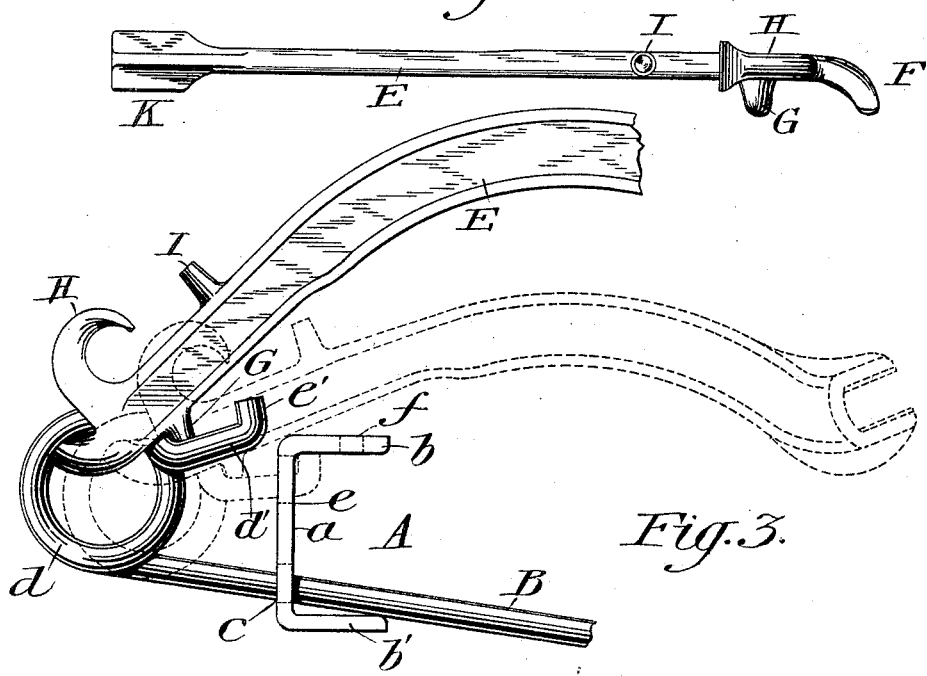
Figure 5:
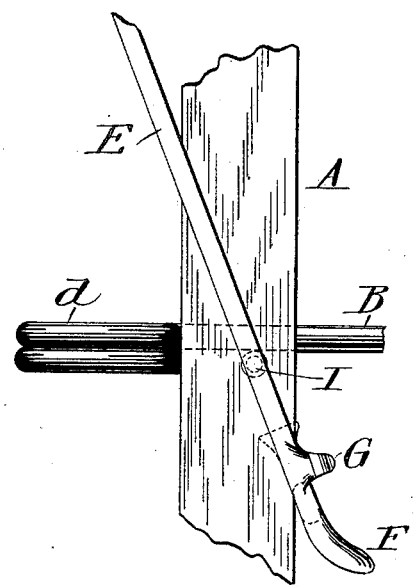
Figure 6:
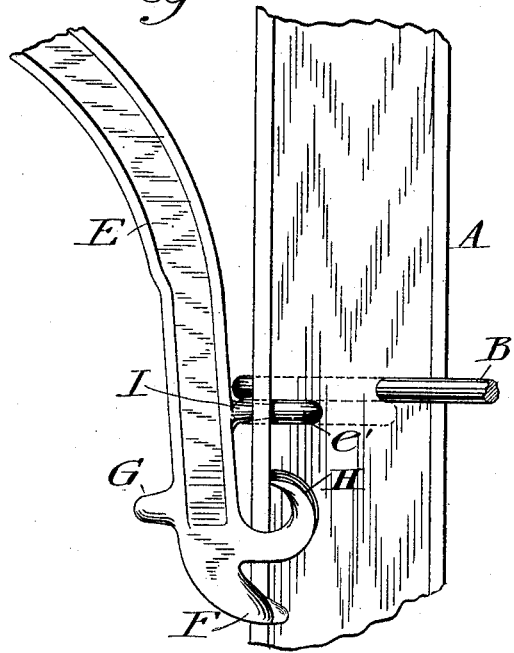
Figure 4:
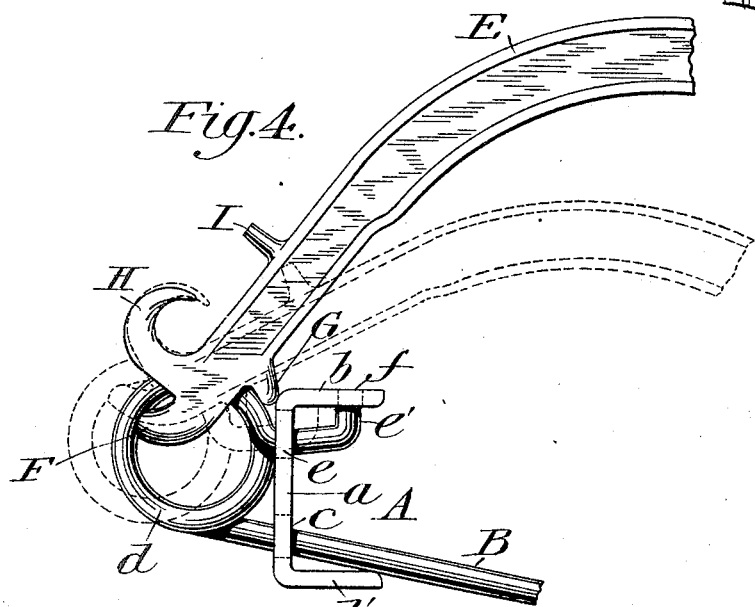

In the drawings, Figure 1 is a side view of my special implement. Fig. 2 is an edge view. Fig. 3 illustrates the application of the implement in the initial steps of the operation of inserting the teeth. Fig. 4 shows the final position of the implement in removing the teeth; and Fig. 5 and 6 are a plan and side elevation of the head or tooth-holder, showing the implement in its initial position when removing the teeth.

In another application, Serial No. 37,806, filed November 26, 1900, I have described and claimed a special form of self-locking spring-tooth with which this implement is intended to coöperate.

The preferable form of this implement is illustrated in Figs. 3 to 6 of the drawings, referring to which, A is a channel-iron forming the head or tooth-holder, having the vertical member $a$ and the horizontal members $b$ and $b'$. The tooth B is preferably made of round wire and has its upper end wound into a coil $d$, beyond which is a portion of suitable length $d'$, having an angular bend forming a locking-detent $e'$. The vertical member of the head $a$ is provided with two slots or holes $c$ and $e$, near its lower and upper edges, respectively. The horizontal member $b$ has a hole $f$, corresponding to the holes $c$ and $e$ of the vertical member. The object of this hole is to securely lock the tooth in the head by means of the detent $e'$, which engages said hole $f$ when the tooth is in place. In setting the teeth in the head, the working shank B is slipped through the hole $c$, the coil $d$ is drawn up against the vertical member $a$, the end $d'$ sprung into line and drawn through the hole $e$, and the detent $e'$ snapped home in the hole $f$ and securely held there by the resilience of the coil. The tooth and the coil are formed of stiff steel rod, which offers great resistance to bending, particularly at the coil. Hence to compress the coil sufficiently to lock the tooth a special implement is essential.

The implement I prefer to use comprises a shank or body E of an I cross-section, the preferable form having a slight curve in its length. One end of said shank terminates in an ordinary wrench-head K. Near the other end of the shank and projecting from one edge thereof with a sharp lateral inclination is the lug G. A coöperating finger F projects from the same end of the shank and is laterally inclined in the same direction as the lug G, but extends substantially in an opposite direction. Projecting from the opposite edge of the shank and in the plane thereof is a hook H and a nib I, the hook having a broad flat edge, drawn back until it lies substantially in the plane of the outer face of the nib and at right angles to the shank.

The implement is manipulated as follows: To insert the tooth in the head, the working shank B is slipped through the hole $c$ and the coil drawn up close to the head. The finger F is passed into the coil and brought to bear on the upper inside surface thereof, while the lug G engages the end $d'$ at the point nearest the coil. The shank E is then moved toward the head, thereby compressing the coil and forcing the end $d'$ toward the shank B until the detent $e'$ is opposite the hole $e$, when the implement, still grasping the coil, is drawn forward and the end $d'$ drawn through the hole $e$ into position indicated by the dotted lines. The tooth is then readily driven into place, so that the locking-detent $e'$ engages the hole $f$, holding the coil snugly against the channel and the tooth rigidly against lateral movements and strains. To remove a tooth, the hook H is caught under the flange b and the nib I brought to bear on the detent e', as in Figs. 5 and 6, forcing said detent out of the hole f. A sharp blow will displace said detent from registry with the hole. The implement is then reversed and again applied, as shown in Fig. 4, to compress the coil. By moving the shank E toward the head the lug G is forced down between the coil d and the channel A and the coil is forced away from the channel, the implement immediately assuming a position indicated in dotted lines. By further compression of the coil the end d', with its locking-detent e', may be readily removed from the hole e, as shown in Fig. 3, the operation being the reverse of that required to insert the tooth. After the locking members d' and e' have been disengaged from the head or tooth-holder there remains only to slip the working shank of the tooth B out of the hole c.

Having thus described my invention, what I claim as new, and desire to secure by Letters Patent, is—

1. An implement for setting spring-teeth in and removing the same from the head or tooth-holder, comprising a shank or body, and means on said shank for forming a clamping engagement with the free end of the coil on its inner and outer sides at non-adjacent points, whereby the coil may be compressed, and the tooth may be moved into or from engagement with the head or tooth-holder.

2. An implement for setting spring-teeth in and removing the same from the head or tooth-holder, comprising a shank or body, a laterally-inclined lug on one edge thereof, and a finger on the end of said shank laterally inclined in the same direction as the said lug, but extending in substantially an opposite direction, the ends of the said lug and finger formed to fit the tooth, substantially as described.

3. An implement for setting spring-teeth in and removing the same from a head or tooth-holder, comprising a shank or body, a laterally-inclined lug on one edge thereof, a finger on the end of said shank laterally inclined in the same direction as the said lug, but extending in substantially an opposite direction, the said lug and finger each being provided with a lip on the side thereof opposite the shank of the implement, a hook formed in the plane of the shank and on the same end thereof as the said finger but on the opposite edge, and a nib located on the same edge as the hook slightly apart therefrom, substantially as described.

4. An implement for setting spring-teeth in and removing the same from a head or tooth-holder, comprising a shank or body, a hook projecting from one edge at the end of the same, said hook being turned back toward the said shank and lying in the plane thereof, and having its end widened laterally, and a nib projecting from the same edge of the said shank and located a short distance inward from the hook, the end of said hook being substantially in the plane of the outer face of the nib, substantially as described.

In testimony whereof I affix my signature in the presence of two witnesses.

JAS. MACPHAIL.

Witnesses:
CHAS. N. CHAMBERS,
J. H. PITKIN.